United States Patent
Okabe et al.

(10) Patent No.: US 11,466,367 B2
(45) Date of Patent: Oct. 11, 2022

(54) METHOD FOR MANUFACTURING PRODUCT WITH BRIGHT SURFACE

(71) Applicant: SANKEI GIKEN KOGYO CO., LTD., Tokyo (JP)

(72) Inventors: Toshio Okabe, Tokyo (JP); Shuji Yamamoto, Tokyo (JP); Daisuke Sato, Tokyo (JP)

(73) Assignee: SANKEI GIKEN KOGYO CO., LTD., Tokyo (JP)

( * ) Notice: Subject to any disclaimer, the term of this patent is extended or adjusted under 35 U.S.C. 154(b) by 1030 days.

(21) Appl. No.: 14/427,754

(22) PCT Filed: Sep. 6, 2013

(86) PCT No.: PCT/JP2013/005297
§ 371 (c)(1),
(2) Date: Mar. 12, 2015

(87) PCT Pub. No.: WO2014/041777
PCT Pub. Date: Mar. 20, 2014

(65) Prior Publication Data
US 2015/0218703 A1    Aug. 6, 2015

(30) Foreign Application Priority Data

Sep. 14, 2012   (JP) .............................. JP2012-202253

(51) Int. Cl.
*C23C 18/16* (2006.01)
*B32B 33/00* (2006.01)
(Continued)

(52) U.S. Cl.
CPC .......... *C23C 18/1653* (2013.01); *B32B 3/266* (2013.01); *B32B 7/12* (2013.01);
(Continued)

(58) Field of Classification Search
None
See application file for complete search history.

(56) References Cited

U.S. PATENT DOCUMENTS 4,696,861 A * 9/1987 Tatematsu ........... C23C 14/0021
428/328
5,688,634 A * 11/1997 Mixon .................... G03F 7/039
430/296
(Continued)

FOREIGN PATENT DOCUMENTS

DE    42 14 905 A1    11/1993
JP    11-131213 A     5/1999
(Continued)

OTHER PUBLICATIONS

Notification of Transmittal of Translation of the International Preliminary Report on Patentability (Form PCT/IB/338), issued in counterpart International Application No. PCT/JP2013/005297 dated Apr. 9, 2015 with Form PCT/IPEA/409 (6 pages).
(Continued)

*Primary Examiner* — Nathan H Empie
(74) *Attorney, Agent, or Firm* — WHDA, LLP

(57) ABSTRACT

A method of manufacturing a bright surface product comprises a step of performing electroless plating to form a first metal film on a base coat layer formed on a substrate, a step of performing electrolytic plating to form a second metal film thereon so that the bonding strength between each film of a multi-layered metal film comprising the first metal film and the second film is higher than the bonding strength between the base coat layer and the first metal layer, a step of integrally and discontinuously segmentalizing the multi-layered metal film with cracks to form an island-like metal film comprising a collection of fine multi-layered metal regions with island-like structures; and a step of forming a translucent top coat layer to cover the fine multi-layered
(Continued)

metal regions of the island-like metal film and enter into the cracks to make contact with the base coat layer.

5 Claims, 3 Drawing Sheets

(51) Int. Cl.
| | |
|---|---|
| *B32B 38/00* | (2006.01) |
| *B32B 3/26* | (2006.01) |
| *B32B 7/12* | (2006.01) |
| *B32B 15/08* | (2006.01) |
| *C25D 5/50* | (2006.01) |
| *C25D 5/12* | (2006.01) |
| *C25D 5/00* | (2006.01) |
| *C25D 7/00* | (2006.01) |
| *C23C 18/30* | (2006.01) |
| *C23C 18/20* | (2006.01) |
| *C23C 18/32* | (2006.01) |
| *C23C 18/48* | (2006.01) |
| *C25D 3/04* | (2006.01) |
| *C25D 3/38* | (2006.01) |
| *C23C 18/28* | (2006.01) |

(52) U.S. Cl.
CPC .............. *B32B 15/08* (2013.01); *B32B 33/00* (2013.01); *B32B 38/0004* (2013.01); *C23C 18/165* (2013.01); *C23C 18/1641* (2013.01); *C23C 18/1692* (2013.01); *C25D 5/12* (2013.01); *C25D 5/50* (2013.01); *C25D 5/505* (2013.01); *C25D 5/625* (2020.08); *C25D 5/627* (2020.08); *C25D 7/00* (2013.01); *B32B 2307/406* (2013.01); *B32B 2307/714* (2013.01); *B32B 2605/08* (2013.01); *C23C 18/204* (2013.01); *C23C 18/2086* (2013.01); *C23C 18/285* (2013.01); *C23C 18/30* (2013.01); *C23C 18/32* (2013.01); *C23C 18/48* (2013.01); *C25D 3/04* (2013.01); *C25D 3/38* (2013.01)

(56) References Cited

U.S. PATENT DOCUMENTS

| | | | | |
|---|---|---|---|---|
| 2002/0141062 A1* | 10/2002 | Christoffersen | ..... | G02B 5/1852 |
| | | | | 359/566 |
| 2004/0202776 A1* | 10/2004 | Huang | ................... | C25D 5/024 |
| | | | | 427/58 |
| 2006/0237320 A1* | 10/2006 | Lin | ........................... | C25D 5/10 |
| | | | | 205/104 |
| 2006/0257633 A1* | 11/2006 | Inoue | ................. | C23C 18/1605 |
| | | | | 428/195.1 |
| 2007/0115167 A1* | 5/2007 | Fujii | ..................... | H01Q 1/3233 |
| | | | | 342/70 |
| 2012/0174824 A1* | 7/2012 | Takenaka | .............. | B22F 1/0055 |
| | | | | 106/404 |

FOREIGN PATENT DOCUMENTS

| | | | | | |
|---|---|---|---|---|---|
| JP | 2007-119896 A | | 5/2007 | | |
| JP | 2007-162125 A | | 6/2007 | | |
| JP | 2008-50656 A | | 3/2008 | | |
| JP | 2011-162839 A | | 8/2011 | | |
| JP | 2011-163903 A | | 8/2011 | | |
| JP | 2011163903 A | * | 8/2011 | ........... | H01Q 1/3283 |
| WO | WO 2011024407 A1 | * | 3/2011 | ................ | B22F 1/00 |

OTHER PUBLICATIONS

Extended (supplementary) European Search Report dated Apr. 8, 2016, issued in counterpart European Application No. 13837443.4. (10 pages).

Examination Report dated Mar. 15, 2017, issued in counterpart European Application No. 13837443.4. (10 pages).

International Search Report dated Dec. 10, 2013, issued in corresponding application No. PCT/JP2013/005297.

* cited by examiner (a)

(b)

(c)

(d)

(a)

(b)

(c)

(d)

(e)

(a)

(b)

(c)

(d)

(e)

(f)

METHOD FOR MANUFACTURING PRODUCT WITH BRIGHT SURFACE

FIELD OF INVENTION

The present invention relates to a bright surface product for automobile parts having stress resistance against collisional external force, and a method of manufacturing a bright surface product having surface brightness.

BACKGROUND ART

Conventionally, products having surface brightness as an automotive part having stress resistance against collisional external force are known such as front grilles, bumper malls, emblems and wheel covers. These types of parts can be manufactured, for example, by performing the steps of: forming, if desired, a base coating layer as an underlying coating on the surface of a synthetic resin substrate or a metal substrate; forming a metal thin film on the surface of the base coating layer by sputtering and the like; and forming a translucent top coat layer on the metal thin film, thereby obtaining brightness due to metallic luster of the metal thin film. Such a metal thin film of a bright surface product is generally a continuous film which is usually formed continuously.

However, in the case of a bright surface product having a continuous metal thin film, the continuous metal thin film can not follow the deformation of the substrate when external force is applied, and crevices tend to be formed and expanded. This formation and expansion of crevices may cause water to infiltrate from outside, resulting in a rusted metal thin film, and the rust is expanding. This may become responsible for detachment of the metal thin film. Further, in a case where a bright surface product undergoes deformation by collision and the like, a plating film which is detached due to crevice generation may fly out as a sharp tip or edge, resulting in creating an extraordinary dangerous situation against a human body.

Therefore, the bright surface product according to Patent Literature 1 has been proposed in order to suppress the aforementioned rust and detachment of a metal thin film as much as possible. The bright surface product according to Patent Literature 1 can be obtained by performing the steps of: forming a metal thin film comprising fine metal particles having a thermal expansion coefficient smaller than that of a substrate on a surface of the substrate or a base coat layer on a surface of the substrate by performing a vacuum metallization process such as a sputtering; increasing the temperature of the whole substrate on which the metal thin film is formed to create fine cracks at the metal thin film by thermal expansion; forming a large number of island structures separated from each other with the cracks; forming a top coat layer to surround the large number of island structures and adhere to the surface of the substrate or the base coat layer through the cracks.

CITATION LIST

Patent Literature

Patent Literature 1: Japanese Patent Application Laid-Open No. H11-131213

SUMMARY OF INVENTION

Technical Problem

Meanwhile, in manufacture of the bright surface product according to Patent Literature 1, large-scale vacuum processing facilities such as vacuum vessels are required in order to perform a vacuum metallization process. Therefore, disadvantageously, the manufacturing cost is expensive, and in particular, a large amount of investment on plant and equipment is required for a large scale production.

The present invention is proposed in view of the above problems. An object of the present invention is to provide a method of manufacturing a bright surface product as an automotive part having stress resistance against collisional external force having good surface brightness and excellent rust and detachment resistance which can be produced in a large scale at low cost, in which further, the formation and expansion of crevices when collisional external force is applied can be prevented to eliminate the possibility of an extraordinary dangerous situation against a human body.

Solution to Problem

The method of manufacturing a bright surface product according to the present invention is a method of manufacturing a bright surface product as an automotive part having stress resistance against collisional external force, and is characterized by comprising: a first step of performing electroless plating to form a first metal film on a substrate or a base coat layer deposited on the substrate; a second step of performing electrolytic plating to form at least a second metal film on the above first metal film so that the bonding strength between each film of a multi-layered metal film comprising at least the above first metal film and the above second metal film is higher than the bonding strength between the above substrate or the above base coat layer and the above first metal layer; a third step of integrally and discontinuously segmentalizing the above multi-layered metal film with cracks at the same place by utilizing the difference in internal stress between the above substrate and the above multi-layered metal film to form an island-like metal film comprising a collection of fine multi-layered metal regions with island-like structures and having an appearance of an integrated bright surface; and a fourth step of forming a translucent top coat layer to cover the above fine multi-layered metal regions of the above island-like metal film and enter into the above cracks to make contact with the above substrate or the above base coat layer.

According to this configuration, a bright surface product having good surface brightness can be obtained by forming an island-like metal film having an appearance of an integrated bright surface. Further, an island-like metal film is formed in a fine multi-layered metal region so that a top coat layer covers the fine multi-layered metal region and enters into cracks to make contact with a substrate and a base coat layer. Therefore, the formation and expansion of crevices when external force is applied can be prevented to eliminate the possibility of an extraordinary dangerous situation against a human body, and in addition the adherence of the top coat layer can be improved to obtain a bright surface product having excellent rust and detachment resistance. Further, since a metal film is formed by electroless plating, electrolytic plating, vacuum processing facilities such as large scale vacuum vessels are not required, allowing a large scale production of bright surface products at low cost. Moreover, provided is a new method of manufacturing a bright surface product having an island-like metal film by a wet process without using dissolution etching which required a large solvent-treatment facility. A new efficient, low cost and environmentally-friendly manufacturing line for forming an island-like metal film by a wet process can be obtained, contributing to diversification of technologies.

Furthermore, diversification of texture of surface brightness, properties of an island-like metal film and applicable bright surface products can be achieved by configuring island-like structures in fine multi-layered metal regions. Further, a multi-layered metal film is integrally and discontinuously segmentalized, and fine multi-layered metal regions of a first metal film, a second metal film and the like, and cracks can be formed at the same place, and will not be formed at different places. Therefore, the appearance and properties of an island-like metal film can be uniformized, and a top coat layer entering into cracks can be reliably brought into contact with a substrate and a base coat layer.

The method of manufacturing a bright surface product according to the present invention is characterized in that in the above second step, electrolytic plating is performed to form a third metal film on the above second metal film so that the bonding strength between each film of a multi-layered metal film comprising the above first metal film, the above second metal film and the above third metal film is higher than the bonding strength between the above substrate or the above base coat layer and the above first metal layer; and in the above third step, the above multi-layered metal film is discontinuously segmentalized with the above cracks by utilizing the difference in internal stress between the above substrate and the above multi-layered metal film comprising the above first metal film, the above second metal film and the above third metal film.

According to this configuration, the diversification of the texture of surface brightness, the properties of an island-like metal film and applicable bright surface products can be further achieved by configuring fine multi-layered metal regions comprising an electroless plating metal layer and two electrolytic plating metal layers.

The method of manufacturing a bright surface product according to the present invention is characterized in that a heat treatment is performed when the above multi-layered metal film is discontinuously segmentalized, and the above multi-layered metal film is discontinuously segmentalized due to the difference in internal stress resulted from the heat treatment, and in addition, the thermal expansion coefficient of the above substrate is 3 times or more than each thermal expansion coefficient of each metal film of the above multi-layered metal film.

According to this configuration, the multi-layered metal film can be reliably and discontinuously segmentalized to form fine multi-layered metal regions separated with cracks can be simply and reliably formed. Further, in a case where the thermal expansion coefficient of a substrate is 3 times or more than each thermal expansion coefficient of each metal film of a multi-layered metal film, cracks relative to the multi-layered metal film can be much more reliably formed at the same place, and therefore, the appearance and properties of an island-like metal film can be uniformized, and a top coat layer entering into the cracks can be reliably brought into contact with the substrate and the base coat layer.

The method of manufacturing a bright surface product according to the present invention is a method of manufacturing a bright surface product as an automotive part having stress resistance against collisional external force, and is characterized by comprising a first step of performing electroless plating to form a metal film on a substrate or a base coat layer deposited on the substrate; a second step of discontinuously segmentalizing the above metal film with cracks by utilizing the difference in internal stress between the above substrate and the above metal film to form an island-like metal film comprising a collection of fine metal regions with island-like structures and having an appearance of an integrated bright surface; and a third step of forming a translucent top coat layer to cover the above fine multi-layered metal regions of the above island-like metal film and enter into the above cracks to make contact with the above substrate or the above base coat layer.

According to this configuration, a bright surface product having good surface brightness can be obtained by forming an island-like metal film having an appearance of an integrated bright surface. Further, an island-like metal film is formed with fine multi-layered metal regions, a top coat layer covers the fine multi-layered metal regions and enter into cracks to make contact with a substrate and a base coat layer. Therefore, the formation and expansion of crevices when external force is applied can be prevented to eliminate the possibility of an extraordinary dangerous situation against a human body, and in addition the adherence of the top coat layer can be improved to obtain a bright surface product having excellent rust and detachment resistance. Further, since a metal film is formed by electroless plating, vacuum processing facilities such as large scale vacuum vessels are not required, allowing a large scale production of bright surface products at low cost. Moreover, provided is a new method of manufacturing a bright surface product having an island-like metal film by a wet process without using dissolution etching which requires a large solvent-treatment facility. A new efficient, low cost and environmentally-friendly manufacturing line for forming an island-like metal film by a wet process can be obtained, contributing to diversification of technologies.

The method of manufacturing a bright surface product according to the present invention is characterized in that the above substrate is of a synthetic resin, or the above substrate and the above base coat layer are of synthetic resins.

According to this configuration, the bonding strength between each film of a multi-layered metal film can be enhanced by utilizing the bonding strength between a substrate or a base coat layer and a first metal layer thereon, and the difference in internal stress can be allowed to easily arise to more simply and reliably perform the formation of cracks in the multi-layered metal film formed on the substrate or the base coat layer. Alternatively, the difference in internal stress can be allowed to easily arise to more simply and reliably perform the formation of cracks in the metal film formed on the substrate or the base coat layer.

The method of manufacturing a bright surface product according to the present invention is characterized in that the widths of the above cracks are 10 nm to 2 µm.

According to this configuration, the appearance of an integrated bright surface and the entrance of a top coat layer into cracks can be simultaneously achieved more reliably.

The method of manufacturing a bright surface product according to the present invention is characterized in that when the above multi-layered metal film or the above metal film is discontinuously segmentalized, a heat treatment is performed to discontinuously segmentalize the above multi-layered metal film or the above metal film by utilizing the difference in internal stress resulted from the heat treatment.

According to this configuration, the difference in thermal stress due to the difference in thermal expansion coefficients is allowed to be created between a substrate and a metal film or a multi-layered metal film to simply and reliably segmentalize the metal film or the multi-layered metal film discontinuously.

The method of manufacturing a bright surface product according to the present invention is characterized in that the above bright surface product as an automotive part having stress resistance against collisional external force is a front grille, a bumper mall or a wheel cover.

Advantageous Effects of Invention

According to the method of manufacturing a bright surface product according to the present invention, a bright surface product having good surface brightness and excellent rust and detachment resistance can be obtained which can be produced in a large scale at low cost, and further, the formation and expansion of crevices when external force is applied can be prevented to eliminate the possibility of an extraordinary dangerous situation against a human body.

DESCRIPTION OF EMBODIMENTS

[Method of Manufacturing Bright Surface Product According to First Embodiment]

Figure 1:
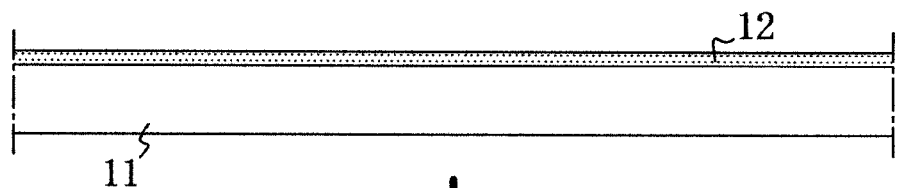
FIG. 1 shows a schematic cross sectional diagram illustrating the flow of the manufacturing steps (a) to (d) in the method of manufacturing a bright surface product according to the first embodiment.
Figure 1:
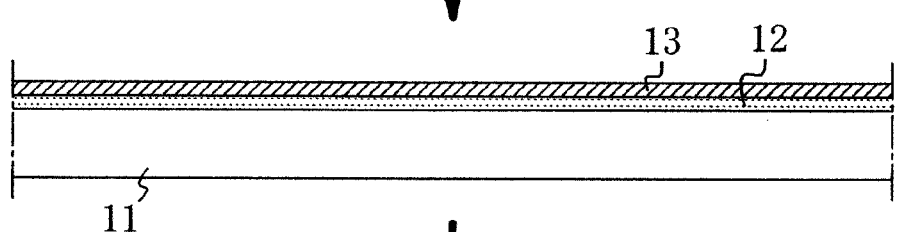
Figure 1:
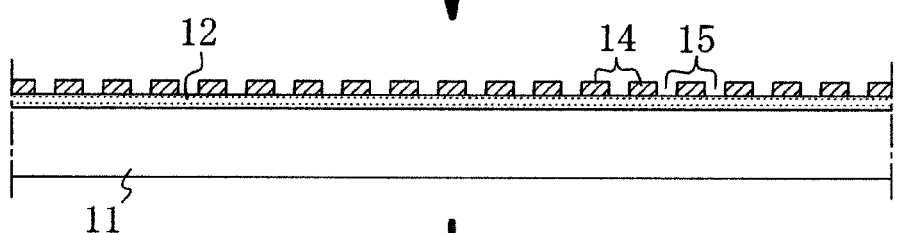
Figure 1:
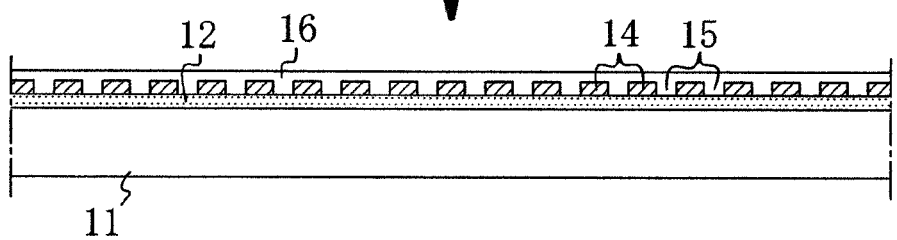

The bright surface product manufactured by the method of manufacturing a bright surface product according to the first embodiment comprises a substrate 11 made of a synthetic resin and the like; a base coat layer 12 made of a synthetic resin and the like deposited on the substrate 11, if desired; an island-like metal film comprising a collection of fine metal regions 14 with island-like structures which is formed on the base coat layer 12 or the substrate 11 by electroless plating; and a top coat layer 16 with translucency covering the fine metal regions 14 of island-like metal film as shown in FIG. 1 (d).

The substrate 11 can be any appropriate material within the scope of the spirit of the present invention, and various materials such as resins, metals, ceramics, paper and glass can be used. For example, appropriate materials applicable in a case where the substrate 11 is of a synthetic resin include ABS (acrylonitrile-butadiene-styrene) resin, AES (acrylonitrile-ethylene-styrene) resin, acrylic resin, polyacetal resin, polyamide resin, polyamidoimide resin, polyimide resin, polyurethane resin, polyester resin, polyethylene resin, polyethylene naphthalate resin, polyether sulphone, polyether ether ketone, liquid crystal polymer (LCP), polyvinyl chloride resin, polyolefin resin such as polypropylene, polycarbonate resin, polystyrene resin, polysulfone resin, cellulose resin, polyphenylene sulfide resin and the like. Alternatively, appropriate materials applicable in a case where the substrate 11 is a metal include iron, aluminum and the like. Further, there is no particular limitation for the form of the substrate 11, and it can be a plate material, a sheet material, a film material, a predetermined solid form and the like.

The base coat layer 12 is provided on the substrate 11 if desired, for example, to improve the adherence of the fine metal region 14 and the topcoat layer 16. For example, in a case where the substrate 11 is of a synthetic resin, the base coat layer 12 is preferably an organic coating film made of a hydrophilic resin material because metal particles having a catalytic activity are adsorbed or adhered to facilitate formation of a uniform catalyst layer even when the surface of the substrate 11 is smooth. As a result, a metal film 13 described below obtained by deposition-substituting the uniform catalyst layer will show good adherence. As the hydrophilic resin material, for example, used are an acrylic resin, a water-insoluble polyester resin, a resin and an isocyanate based compound having a hydroxy group, a hydrophilic and/or water soluble resin having a hydroxy group and the like. Further, in order to prevent the base coat layer 12 from eluting and exfoliating to a catalyst liquid and an electroless plating liquid when the substrate 11 is exposed to the catalyst liquid and the electroless plating liquid in an electroless plating step, and also in order to improve the life time of the catalyst liquid and the electroless plating liquid by preventing the elution, the hydrophilic resin material is preferably water-insoluble, and in a case where it is water-soluble, it is preferably converted to be water-insoluble by performing a hardening treatment and the like. Further, in a case where the substrate 11 is of a synthetic resin, instead of providing the base coat layer 12 in order to improve the adhesion of electroless plating, an ultraviolet irradiation may be performed on the surface of the substrate 11 under the atmosphere to form a modified layer on the surface, and electroless plating may be performed on the modified layer to form an island-like metal film comprising a collection of the fine metal regions 14 with island-like structures.

The fine metal regions 14 with island-like structures are formed by electroless plating described below and segmentalization due to the difference in internal stress, and an island-like metal film comprises a collection of the fine metal regions 14 with island-like structures separated with cracks 15, and has an appearance of an integrated bright surface. The island-like metal film comprising the fine metal regions 14 or a collection thereof, can be formed with an appropriate metal which can be deposited by electroless plating, but preferred are, for example, nickel or a nickel alloy, palladium or a palladium alloy, tin or a tin alloy, copper or a copper alloy, silver or a silver alloy, gold or a gold alloy, cobalt or a cobalt alloy and the like.

The mean maximum width of the fine metal regions 14 (the longest distance between edges when a distance from one edge to the other of the fine metal region 14 to be measured, or a diameter obtained by computing a diameter of a circle having the same area as the fine metal region 14 by using an image processing system and the like) is, for example, around 20 μm. Further, in a case where the width of the crack 15 is too small, the entrance and adhesion of the top coat layer 16 into the cracks 15 is difficult to be achieved. In a case where it is too large, the appearance of an integrated bright surface is difficult to be achieved. Therefore, the width is preferably 10 nm to 2 μm, more preferably 30 nm to 500 nm.

The top coat layer 16 with translucency is formed to cover the fine metal regions 14 of the island-like metal film and enter into the cracks 15 to make contact with the base coat layer 12 or the substrate 11. The top coat layer 16 is formed, for example, with silicone acrylic resin, acryl urethane resin, urethane resin and the like.

When manufacturing a bright surface product according to the first embodiment, the base coat layer 12 is deposited, if desired, on the substrate 11 as shown in FIG. 1 (a). The base coat layer 12 is formed, for example, by providing and drying an organic coating material such as an acrylic urethane based coating material on the substrate 11 by application or immersion. Further, in a case where the substrate 11 is of a synthetic resin, instead of providing the base coat layer 12, an ultraviolet irradiation may be performed on the surface of the substrate 11 under the atmosphere to form a modified layer on the surface, and the metal film 13 described below may be formed by electroless plating.

Then, as shown in FIG. 1 (b), electroless plating is performed on the base coat layer 12 deposited on the substrate 11 to form the metal film 13 as a continuous film. The metal film 13 can be formed with an appropriate metal which can be deposited by electroless plating. For example, the followings can be used: nickel or a nickel alloy, palladium or a palladium alloy, tin or a tin alloy, copper or a copper alloy, silver or a silver alloy, gold or a gold alloy, cobalt or a cobalt alloy and the like. Note that in a case where the base coat layer 12 is not provided on the substrate 11, electroless plating is performed to directly form the metal film 13 on the substrate 11.

The step of electroless plating described above can be performed according to appropriate procedures. For example, the metal film 13 can be formed by conventional procedures such as those comprising immersing the substrate 11 having the base coat layer 12 or the substrate 11 in a tin-palladium mixed catalyst solution which is generally called a catalyst solution, and washing with water, and then immersing in an accelerator (a promoter) comprising 5 vol % to 10 vol % of sulfuric acid or hydrochloric acid to deposit a metal using palladium adsorbed on the surface as a catalyst. However, the immersion time into an electroless plating bath is preferably more than 10 seconds in order to form the metal film 13 as a continuation film.

As the electroless plating baths, known electroless plating baths containing salts of a metal (including an alloy) to be deposited on the surface of the base coat layer 12 or the substrate 11, a reducing agent and the like can be used. For example, preferred are electroless plating baths of nickel or a nickel alloy, palladium or a palladium alloy, tin or a tin alloy, copper or a copper alloy, silver or a silver alloy, gold or a gold alloy or cobalt or a cobalt alloy. Note that, of course, in the step of electroless plating, various pre-treatments may be performed such as a cleaning treatment such as a degreasing treatment by acid/alkali wash and the like, a conditioning treatment and a pre-dipping treatment with a commercially available chemical liquid and the like. Further, in a case where the surface of the substrate 11 is smooth, and a catalyst does not adhere well, a pre-treatment such as surface roughening of the surface of the substrate 11 may be performed by mechanical, chemical or optical treatments (UV treatments, plasma treatments and the like).

Then, as shown in FIG. 1 (c), by utilizing the difference in internal stress between the substrate 11 and the metal film 13, the metal film 13 is discontinuously segmentalized with the cracks 15 to form an island-like metal film comprising a collection of the fine metal regions 14 with island-like structures and having an appearance of an integrated bright surface. This segmentalization of the metal film 13 due to the difference in internal stress may be due to, for example, the difference in internal stress between the substrate 11 and the metal film 13 which is produced during a heat treatment at 80° C. or more and the like, or the difference in internal stress between the substrate 11 and the metal film 13 which remains in a state where they are removed from an electroless plating bath. Note that even in a case where the base coat layer 12 is provided, since the thickness of the base coat layer 12 is thinner by an order of magnitude than that of the substrate 11, the influence from the internal stress in the base coat layer 12 is small, and thus, the metal film 13 will be segmentalized with the cracks 15 due to the difference in internal stress between the substrate 11 and the metal film 13.

The thermal expansion coefficient of the substrate 11 is preferably larger than that of the metal film 13 so that the difference in thermal stress between the substrate 11 and the metal film 13 can be created due to the difference in thermal expansion coefficients when a heat treatment is performed. Then the metal film 13 can be discontinuously segmentalized in a simple and reliable fashion. In this case, further preferably, the thermal expansion coefficient of the substrate 11 is 3 times or more, more preferably 4 times or more than that of the metal film 13 because the fine metal regions 14 separated and isolated with the cracks 15 can be more reliably formed. Note that even in a case where the base coat layer 12 is provided, the thermal expansion coefficient of the substrate 11 is preferably larger than that of the metal film 13, and the thermal expansion coefficient of the substrate 11 is preferably 3 times or more, more preferably 4 times or higher than that of the metal film 13 so that the fine metal regions 14 separated and isolated with the cracks 15 can be more reliably formed as well.

Then, as shown in FIG. 1 (d), the top coat layer 16 with translucency is formed so as to cover the fine metal regions 14 of the island-like metal film and enter into the cracks 15 to make contact with the base coat layer 12 or the substrate 11. The top coat layer 16 is formed, for example, by providing and drying a top coat material such as silicone acrylic resin, acryl urethane resin and urethane resin by application or immersion. This allows the top coat layer 16 to cover each of the fine metal regions 14 and enter into the cracks 15 to closely adhere to the base coat layer 12 or the substrate 11.

According to the method of manufacturing a bright surface product according to the first embodiment, a bright surface product having good surface brightness can be obtained by forming an island-like metal film having an appearance of an integrated bright surface. Further, an island-like metal film is formed with the fine metal regions 14 so that the top coat layer 16 covers the fine metal regions 14 and enters into the cracks 15 to make contact with the base coat layer 12 and the substrate 11. Therefore, the formation and expansion of crevices when external force is applied can be prevented to eliminate the possibility of an extraordinary dangerous situation against a human body, and in addition the adherence of the top coat layer 16 can be improved to obtain a bright surface product having excellent rust and detachment resistance.

Further, since the metal film. 13 is formed by electroless plating, large scale vacuum treating facilities such as vacuum vessels are not required, allowing a large scale production of a bright surface product at low cost. Moreover, provided is a new method of manufacturing a bright surface product having an island-like metal film by a wet process without using dissolution etching which requires a large solvent-treatment facility. Then a new efficient, low cost and environmentally-friendly manufacturing line for forming an island-like metal film by a wet process can be obtained, contributing to diversification of technologies. Further, island-like metal films of various metals such as nickel or a nickel alloy can be obtained, and the properties of these various metals can be used effectively. Moreover, in a case where the substrate 11 is of a synthetic resin, or the substrate 11 and the base coat layer 12 are of synthetic resins, the difference in internal stress may be allowed to easily arise to form the cracks 15 in the metal film 13 more simply and reliably.

[Method of Manufacturing Bright Surface Product According to Second Embodiment]

Figure 2:
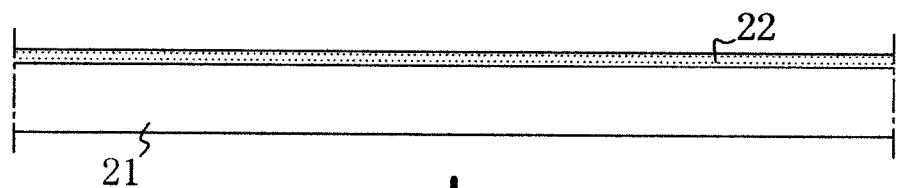
FIG. 2 shows a schematic cross sectional diagram illustrating the flow of the manufacturing steps (a) to (e) in the method of manufacturing a bright surface product according to the second embodiment.
Figure 2:
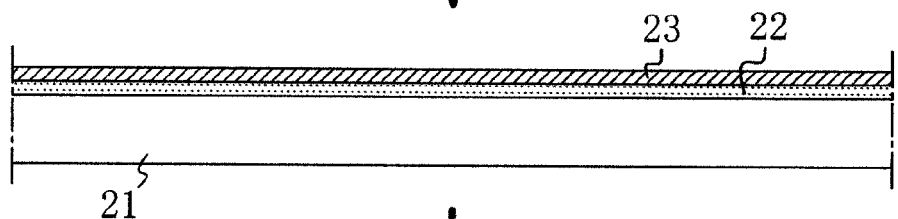
Figure 2:
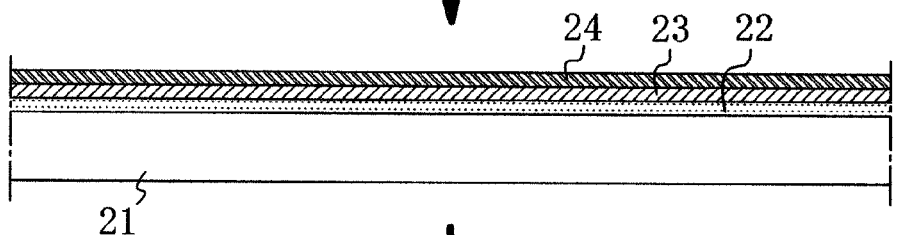
Figure 2:
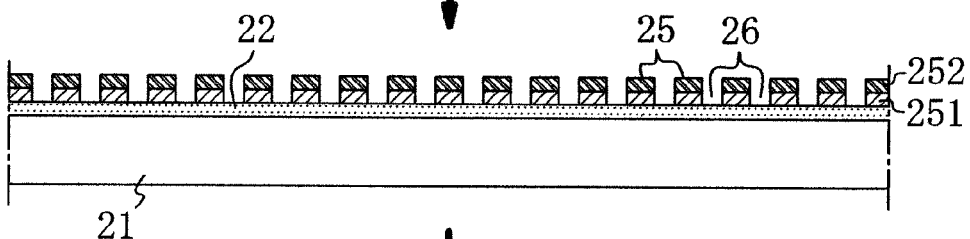
Figure 2:
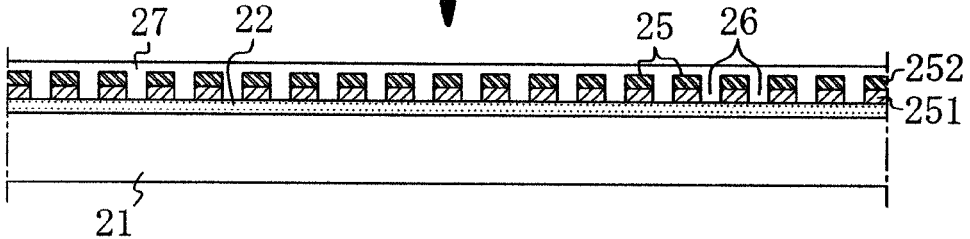

As shown in FIG. 2 (*e*), the bright surface product as an automotive part having stress resistance against collisional external force manufactured by the method of manufacturing a bright surface product according to the second embodiment comprises a substrate 21 made of a synthetic resin and the like, a base coat layer 22 made of a synthetic resin and the like deposited on the substrates 21 if desired, an island-like metal film formed on the base coat layer 22 or the substrate 21 comprising fine multi-layered metal regions 25 with island-like structures and a top coat layer 27 with translucency covering the fine multi-layered metal regions 25 of the island-like metal film. Further, the fine multi-layered metal region 25 comprises a first metal layer 251 formed on the base coat layer 22 or the substrate 21 by electroless plating and a second metal layer 252 formed on the first metal layer 251 by electrolytic plating.

The substrate 21 and the base coat layer 22 provided on the substrate 21 if desired are fundamentally the same as the substrate 11 and the base coat layer 12 according to the first embodiment. Alternatively in a case where the base coat layer 22 is not provided depending on the substrate 21, the island-like metal film comprising a collection of the fine multi-layered metal regions 25 with island-like structures is directly formed on the substrate 21, and the top coat layer 27 with translucency described below is formed to cover the fine multi-layered metal regions 25 of the island-like metal film and enter into the cracks 26 to make contact with the substrate 21. Further in a case where the substrate 21 is of a synthetic resin as in the first embodiment, instead of providing the base coat layer 22, an ultraviolet irradiation may be performed on the surface of the substrate 21 under the atmosphere to form a modified layer on the surface in order to improve the adhesion of electroless plating, and an island-like metal film comprising a collection of the fine multi-layered metal regions 25 with island-like structures described below may be formed on the modified layer by electroless plating.

The fine multi-layered metal region 25 with an island-like structure forms a first metal film 23 by electroless plating and a second metal film 24 by electrolytic plating as described below, and is formed by segmentalization due to the difference in internal stress. The fine multi-layered metal region 25 is configured such that the first metal layer 251 by electroless plating and the second metal layer 252 by electrolytic plating are layered. The island-like metal film thereof comprises a collection of the fine multi-layered metal regions 25 with island-like structures separated with the cracks 26, and has an appearance of an integrated bright surface.

The first metal layer 251 or the first metal film 23 may be formed with an appropriate metal which can be deposited by electroless plating. For example, preferred are nickel or a nickel alloy, palladium or a palladium alloy, tin or a tin alloy, copper or a copper alloy, silver or a silver alloy, gold or a gold alloy, cobalt or a cobalt alloy or the like. Further, the second metal layer 252 or the second metal film 24 may be formed with an appropriate metal. For example, preferred are chromium or a chromium alloy, gold or a gold alloy or the like which have sufficient metallic luster and rust resistance.

The mean maximum width (the longest distance between edges when a distance from one edge to the other of the fine multi-layered metal region 25 to be measured, or a diameter obtained by computing a diameter of a circle having the same area as the fine multi-layered metal region 25 by using an image processing system and the like) is, for example, around 20 μm. Further, in a case where the width of the crack 26 is too small, the entrance and adhesion of the top coat layer 27 into and on the crack 26 is difficult to be achieved. In a case where it is too large, the appearance of an integrated bright surface is difficult to be achieved. Therefore, the width is preferably 10 nm to 2 μm, more preferably 30 nm to 500 nm.

As in the first embodiment, the top coat layer 27 with translucency is formed to cover the fine multi-layered metal regions 25 of the island-like metal film and enter into the cracks 26 to make contact with the base coat layer 22 or the substrate 21. The top coat layer 27 is formed with, for example, silicone acrylic resin, acryl urethane resin, urethane resin and the like.

When manufacturing a bright surface product according to the second embodiment, as shown in FIG. 2 (*a*) and (*b*), the base coat layer 22 is deposited on the substrate 21 if desired, and electroless plating is performed to form the first metal film 23 as a continuous film on the base coat layer 22 deposited on the substrate 21 or the substrate 21. Procedures for formation of the base coat layer 22 and formation of the first metal film 23 are similar to those for formation of the base coat layer 12 and formation of the metal film 13 according to the first embodiment. Further, in a case where the substrate 21 is of a synthetic resin, instead of providing the base coat layer 22, an ultraviolet irradiation may be performed on the surface of the substrate 21 under the atmosphere to form a modified layer on the surface, and the first metal film 23 may be formed thereon by electroless plating.

Then, as shown in FIG. 2 (*c*), electrolytic plating is performed on the first metal film 23 to form the second metal film 24 as a continuous film comprising the same or different type of a metal as the first metal film 23 so that the bonding strength between each film of the multi-layered metal film comprising the first metal film 23 and the second metal film 24 becomes larger than the bonding strength between the base coat layer 22 or the substrate 21 and the first metal film 23. That is, for the base coat layer 22 or the substrate 21, those can be used in which the bonding strength with the first metal film 23 is weaker than that between each film of the multi-layered metal film. For example, the substrate 21 made of a synthetic resin and the base coat layer 22 as an organic coating film of a synthetic resin may be used such that the bonding strength between each film of the multi-layered metal film to be metal-bonded becomes much stronger than that with the base coat layer 22 or the substrate 21 and the first metal film 23. The second metal film 24 is formed, for example with electrolytic plating bath of chromium or a chromium alloy and the like.

Then, as shown in FIG. 2 (*d*), by utilizing the difference in internal stress between the substrate 21 and a multi-layered metal film comprising the first metal film 23 and the second metal film. 24, the multi-layered metal film is discontinuously and integrally segmentalized with the cracks 26 to form an island-like metal film comprising a collection of the fine multi-layered metal regions 25 with island-like structures and having an appearance of an integrated bright surface. This segmentalization of the multi-layered metal film due to the difference in internal stress may be due to, for example, the difference in internal stress between the substrate 21 and the multi-layered metal film which is produced during a heat treatment at 80° C. or more and the like, or the difference in internal stress between the substrate 21 and the multi-layered metal film which remains in a state where they are removed from an electrolytic plating bath. Note that even in a case where the base coat layer 22 is provided, since the thickness of the base coat layer 22 is thinner by an order of magnitude than that of the substrate 21, the influence from the internal stress in the base coat layer 22 is small, and thus, the multi-layered metal film will be segmentalized with the cracks 26 due to the difference in internal stress between the substrate 21 and the metal films 23, 24 or the first metal film 23.

The thermal expansion coefficient of the substrate 21 is preferably larger than that of the first metal film 23 so that the difference in thermal stress between the substrate 21 and the multi-layered metal film or the first metal film 23 can be created due to the difference in thermal expansion coefficients when a heat treatment is performed. Then the multi-layered metal film can be discontinuously segmentalized in a simple and reliable fashion.

Further, in a case where the difference in internal stress is created by a heat treatment, a thermal expansion coefficient of the substrate 21 more than each thermal expansion coefficient of each of the metal films 23, 24 of the multi-layered metal film by 3 times or more, more preferably by 4 times or more is further preferred because the cracks 26 relative to the multi-layered metal film, i.e., the cracks 26 relative to the first metal film 23 and the second metal film 24 can be formed at the same place in a more reliable fashion such that the fine multi-layered metal regions 25 separated and isolated with the cracks 26 can be more reliably formed, and in addition the appearance and properties of an island-like metal film can be uniformized, and the top coat layer 27 described below entering into the crack 26 can be reliably brought into contact with the base coat layer 22 and the substrate 21. Note that even in a case where the base coat layer 22 is provided, the thermal expansion coefficient of the substrate 21 is preferably larger than each thermal expansion coefficient of each of the metal films 23, 24 or the thermal expansion coefficient of the first metal film 23, and the thermal expansion coefficient of the substrate 21 is preferably 3 times or more, more preferably 4 times or more than each thermal expansion coefficient of each of the metal films 23, 24 such that the fine multi-layered metal regions 25 separated with the cracks 26 can be reliably formed.

Then, as shown in FIG. 2 (e), the top coat layer 27 with translucency is formed so as to cover the fine multi-layered metal regions 25 of the island-like metal film and enter into the cracks 26 to make contact with the base coat layer 22 or the substrate 21. The top coat layer 27 is formed as in the top coat layer 16 according to the first embodiment to cover each of the fine multi-layered metal regions 25 and enter into the cracks 26 to closely adhere to the base coat layer 22 or the substrate 21.

According to the method of manufacturing a bright surface product according to the second embodiment, a bright surface product having good surface brightness can be obtained by forming an island-like metal film having an appearance of an integrated bright surface. Further, an island-like metal film is formed with the fine metal regions 25, and the top coat layer 27 covers the fine multi-layered metal regions 25 and enters into the cracks 26 to make contact with the base coat layer 22 and the substrate 21. Therefore, the formation and expansion of crevices when external force is applied can be prevented to eliminate the possibility of an extraordinary dangerous situation against a human body, and in addition the adherence of the top coat layer 27 can be improved to obtain a bright surface product having excellent rust and detachment resistance.

Further, since the metal films 23, 24 are formed by electroless plating, electrolytic plating, large scale vacuum treating facilities such as vacuum vessels are not required, allowing a large scale production of a bright surface product at low cost. Moreover, provided is a new method of manufacturing a bright surface product having an island-like metal film by a wet process without using dissolution etching which requires a large solvent-treatment facility. Then a new efficient, low cost and environmentally-friendly manufacturing line for forming an island-like metal film by a wet process can be obtained, contributing to diversification of technologies.

Further, the diversification of the texture of surface brightness, the properties of an island-like metal film and applicable bright surface products can be achieved by configuring island-like structures in fine multi-layered metal regions 25. Moreover, a multi-layered metal film is integrally and discontinuously segmentalized, and the fine multi-layered metal regions 25 of the first metal film 23 and the second metal film 24 and the cracks 26 can be formed at the same place, and will not be formed at different places. Therefore, the appearance and properties of an island-like metal film can be uniformized, and a top coat layer entering into the cracks 26 can be reliably brought into contact with the base coat layer 22 and the substrate 21. Furthermore, in a case where the substrate 21 is of a synthetic resin, or the substrate 21 and the base coat layer 22 are of synthetic resins, the bonding strength between each film of a multi-layered metal film can be enhanced due to the bonding strength between these and the first metal layer 23, and the difference in internal stress can be allowed to be easily arise to more simply and reliably form cracks in the multi-layered metal film.

[Method of Manufacturing Bright Surface Product According to Third Embodiment]

Figure 3:
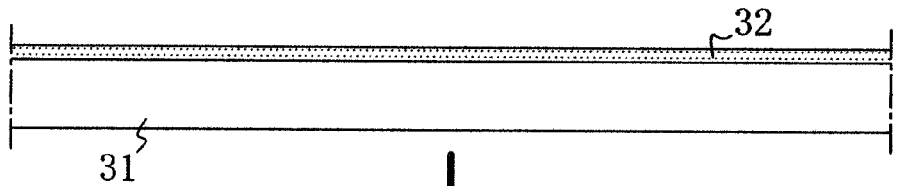
FIG. 3 shows a schematic cross sectional diagram illustrating the flow of the manufacturing steps (a) to (f) in the method of manufacturing a bright surface product according to the third embodiment.
Figure 3:
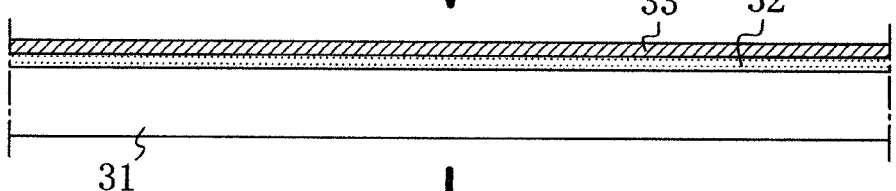
Figure 3:
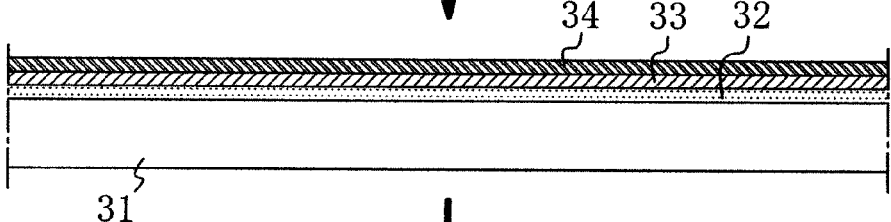
Figure 3:
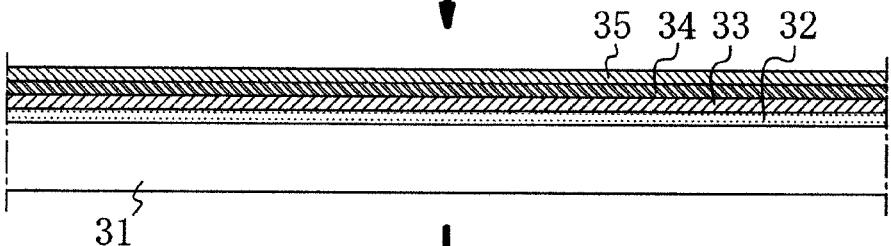
Figure 3:
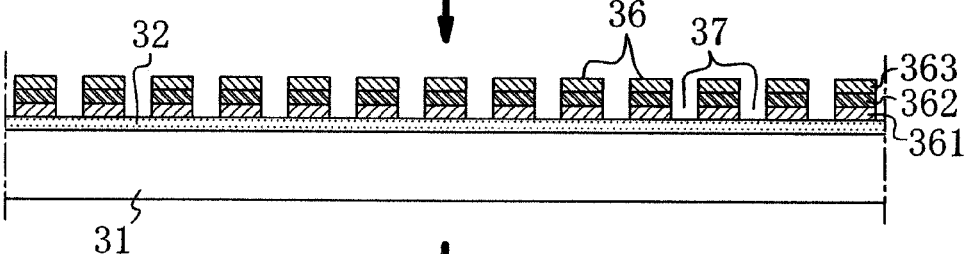
Figure 3:
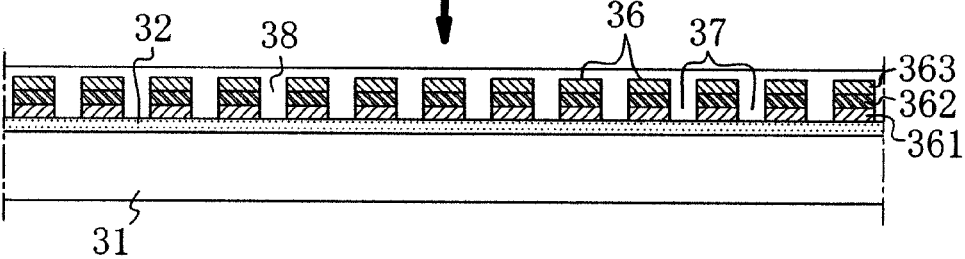

As shown in FIG. 3 (f), the bright surface product manufactured by the method of manufacturing a bright surface product according to the third embodiment comprises a substrate 31 made of a synthetic resin and the like, a base coat layer 32 made of a synthetic resin and the like deposited on the substrate 31 if desired, an island-like metal film formed on the base coat layer 32 or the substrate 31 comprising fine multi-layered metal regions 36 with island-like structures and a top coat layer 38 with translucency covering the fine multi-layered metal regions 36 of the island-like metal film. Further, the fine multi-layered metal region 36 comprises a first metal layer 361 formed on the base coat layer 32 or the substrate 31 by electroless plating, a second metal layer 362 formed on the first metal layer 361 by electrolytic plating and a third metal layer 363 formed on the second metal layer 362 by electrolytic plating.

The substrate 31 and the base coat layer 32 provided on the substrate 31 if desired are fundamentally the same as the substrates 11, 21 and the base coat layers 12, 22 according to the first and second embodiments. Alternatively in a case where the base coat layer 32 is not provided depending on the substrate 31, an island-like metal film comprising a collection of the fine multi-layered metal regions 36 with island-like structures may be directly formed on the substrate 31, and the top coat layer 38 with translucency described below is formed to cover the fine multi-layered metal regions 36 of the island-like metal film and enter into the cracks 37 to make contact with the substrate 31. Further in a case where the substrate 31 is of a synthetic resin as in the first and second embodiments, instead of providing the base coat layer 32, an ultraviolet irradiation may be performed on the surface of the substrate 31 under the atmosphere to form a modified layer on the surface in order to improve the adhesion of electroless plating, and an island-like metal film comprising a collection of the fine multi-layered metal regions 36 with island-like structures described below may be formed on the modified layer by performing electroless plating.

The fine multi-layered metal region 36 with an island-like structure forms a first metal film 33 by electroless plating, a second metal film 34 and a third metal film 35 by electrolytic plating as described below, and is formed by segmentalization due to the difference in internal stress. The fine multi-layered metal region 36 is configured such that the first metal layer 361 by electroless plating, the second metal layer 362 and the third metal layer 363 by electrolytic plating are layered. The island-like metal film thereof comprises a collection of the fine multi-layered metal regions 36 with island-like structures separated with the cracks 37, and has an appearance of an integrated bright surface.

The first metal layer 361 or the first metal film 33 may be formed with an appropriate metal which can be deposited by electroless plating. For example, preferred are nickel or a nickel alloy, palladium or a palladium alloy, tin or a tin alloy, copper or a copper alloy, silver or a silver alloy, gold or a gold alloy, cobalt or a cobalt alloy or the like. Further, the second metal layer 362 or the second metal film 34 can be formed with an appropriate metal. Moreover, the third metal layer 363 or the third metal film 35 can be formed with an appropriate metal. For example, preferred are chromium or a chromium alloy, gold or a gold alloy or the like which have sufficient metallic luster and rust resistance.

Furthermore, as in the second embodiment, the mean maximum width of the fine multi-layered metal regions 36 is, for example, around 5 μm. Moreover, in a case where the width of the crack 37 is too small, the entrance and adhesion of the top coat layer 38 into and on the crack 37 is difficult to be achieved. In a case where it is too large, the appearance of an integrated bright surface is difficult to be achieved. Therefore, the width is preferably 10 nm to 2 μm, more preferably 30 nm to 500 nm.

As in the first embodiment, the top coat layer 38 with translucency is formed to cover the fine multi-layered metal regions 36 of the island-like metal film and enter into the cracks 37 to make contact with the base coat layer 32 or the substrate 31. The top coat layer 38 is formed with, for example, silicone acrylic resin, acryl urethane resin, urethane resin and the like.

When manufacturing a bright surface product according to the third embodiment, as shown in FIG. 3 (a) and (b), the base coat layer 32 is deposited on the substrate 31 if desired, and electroless plating is performed to form the first metal film 33 as a continuous film on the base coat layer 32 deposited on the substrate 31 or the substrate 31. Procedures for formation of the base coat layer 32 and formation of the first metal film 33 are similar to those for formation of the base coat layers 12, 22 and formation of the metal film 13 and the first metal film 23 according to the first and second embodiments. Further, in a case where the substrate 31 is of a synthetic resin, instead of providing the base coat layer 32, an ultraviolet irradiation may be performed on the surface of the substrate 31 under the atmosphere to form a modified layer on the surface, and the first metal film 33 may be formed thereon by electroless plating.

Then, as shown in FIG. 3 (c), electrolytic plating is performed on the first metal film 33 to form the second metal film 34 as a continuous film comprising the same or different type of a metal as the first metal film 33, and as shown in FIG. 3 (d), electrolytic plating is further performed on the second metal film 34 to form the third metal film 35 as a continuous film comprising the same or different type of a metal as the first metal film 33 or the second metal film 34 so that the bonding strength between each film of the multi-layered metal film comprising the first metal film 33, the second metal film 34 and the third metal film 35 becomes larger than the bonding strength between the base coat layer 32 or the substrate 31 and the first metal film 33. That is, for the base coat layer 32 and the substrate 31, those can be used in which the bonding strength with the first metal film 33 is weaker than that between each film of the multi-layered metal film. For example, the substrate 31 made of a synthetic resin and the base coat layer 32 made of an organic coating film of a synthetic resin may be used such that the bonding strength between each film of the multi-layered metal film to be metal-bonded becomes much stronger than that with the base coat layer 32 or the substrate 31 and the first metal film 33.

Then, as shown in FIG. 3 (e), by utilizing the difference in internal stress between the substrate 31 and the multi-layered metal film comprising the first metal film 33, the second metal film 34 and the third metal film 35, the multi-layered metal film is discontinuously and integrally segmentalized with the cracks 37 to form an island-like metal film comprising a collection of the fine multi-layered metal regions 36 with island-like structures and having an appearance of an integrated bright surface. This segmentalization of the multi-layered metal film due to the difference in internal stress may be due to, for example, the difference in internal stress between the substrate 31 and the multi-layered metal film which is produced during a heat treatment at 80° C. or more and the like, or the difference in internal stress between the substrate 31 and the multi-layered metal film which remains in a state where they are removed from an electrolytic plating bath. Note that even in a case where the base coat layer 32 is provided, the thickness of the base coat layer 32 is thinner by an order of magnitude than that of the substrate 31, the influence from the internal stress in the base coat layer 32 is small, and thus, the multi-layered metal film will be segmentalized with the cracks 37 due to the difference in internal stress between the substrate 31 and the metal films 33, 34, 35 or the first metal film 33.

The thermal expansion coefficient of the substrate 31 is preferably larger than that of the first metal film 33 so that the difference in thermal stress between the substrate 31 and the multi-layered metal film or the metal film 33 resulted from the difference in thermal expansion coefficients can be created when a heat treatment is performed. Then the multi-layered metal film can be discontinuously segmentalized in a simple and reliable fashion.

Further, in a case where the difference in internal stress is created by a heat treatment, a thermal expansion coefficient of the substrate 31 more than each thermal expansion coefficient of each of the metal films 33, 34, 35 of the multi-layered metal film by 3 times or more, more preferably by 4 times or more is further preferred because the cracks 37 relative to the multi-layered metal film, i.e., the cracks 37 relative to the first metal film 33, the second metal film 34 and the third metal film 35 can be formed at the same place in a more reliable fashion such that the fine multi-layered metal regions 36 separated and isolated with the cracks 37 can be more reliably formed, and the appearance and properties of an island-like metal film can be uniformized, and the top coat layer 38 described below entering into the cracks 37 can be reliably brought into contact with the base coat layer 32 and the substrate 31. Note that even in a case where the base coat layer 32 is provided, as in the first and second embodiments, the thermal expansion coefficient of the substrate 31 is preferably larger than each thermal expansion coefficient of each of the metal films 33, 34, 35 or the thermal expansion coefficient of the first metal film 33, and the thermal expansion coefficient of the substrate 31 is preferably 3 times or more, more preferably 4 times or more than each thermal expansion coefficient of each of the metal films 33, 34, 35 such that the fine multi-layered metal regions 36 separated with the cracks 37 can be reliably formed.

Then, as shown in FIG. 3 (f), the top coat layer 38 with translucency is formed to cover the fine multi-layered metal regions 36 of the island-like metal film and enter into the cracks 37 to make contact with the base coat layer 32 or the substrate 31. The top coat layer 38 is formed as in the top coat layers 16, 27 according to the first and second embodiments to cover each of the fine multi-layered metal regions 36 and enter into the crack 37 to closely adhere to the base coat layer 32 or the substrate 31.

According to the method of manufacturing a bright surface product according to the third embodiment, similar effects as in the second embodiment can be achieved based on the configuration corresponding to the second embodiment. Further, the diversification of the texture of surface brightness, the properties of an island-like metal film and applicable bright surface products can be further achieved by configuring an island-like structures in a fine multi-layered metal region comprising the first metal layer 361 by electroless plating and two layers by electrolytic plating of the second metal layer 362 and the third metal layer 363.

Other Variations of the Embodiments and the Like

The invention disclosed in this specification includes, in addition to configurations of respective inventions and configurations of respective embodiments, in an applicable range, a matter defined by modifying any of these partial configurations into other configurations disclosed in this specification, a matter defined by adding any of other configurations disclosed in the this specification to these partial configurations, or a matter defined into a generic concept by cancelling any of these partial configurations as long as a partial operational advantage can be obtained. Then, the following variations are also included.

For example, in a case where electrolytic plating is sequentially performed on a metal film by electroless plating to laminate multiple metal films, any number of layers of the multiple metal films by electrolytic plating can be used, and three or more layers of the multiple metal films may be formed by electrolytic plating. Even in this case, as in the above embodiments, a multi-layered metal film can be integrally and discontinuously segmentalized to form a fine multi-layered metal film by utilizing the difference in internal stress of thermal stress by a heat treatment or the difference in internal stress of internal stress which remains in a state where they are removed from an electrolytic plating bath.

Further, the metal film 13 and the fine metal region 14 by electroless plating according to the first embodiment can be a single layer, a multi-layered metal film or a multi-layered fine metal region layered and formed by performing electroless plating multiple times. Alternatively, the first metal films 23, 33 and the first metal layers 251, 361 by electroless plating according to the second and third embodiments can also be a single layer, a multi-layered metal film or a multi-layered fine metal region layered and formed by performing electroless plating multiple times

EXAMPLES

Example 1

Example 1 corresponds to the first embodiment. Using ABS resin (MTH2, Japan A&L Inc., Size: 130 mm×80 mm×3 mm; thermal expansion coefficient: $60 \times 10^{-6}/°$ C.) as a substrate, one side of the ABS resin substrate was irradiated with a mixed UV of wavelengths of 184.9 nm and 253.7 nm at an irradiation intensity of 28 mW/cm$^2$ for 10 minutes with an UV irradiation apparatus to form a modified layer on the surface of the ABS resin substrate.

Subsequently, it was immersed into benzalkonium chloride as a surfactant at 40° C. for 1 minute. Then, after dipped in Catalyst C at 30° C. for 5 minutes to perform a catalyst addition treatment, it was immersed in a buffer solution at pH 2.5 and 40° C. for 1 minute. After immersed in 5% sulfuric acid at 40° C. for 5 minutes as a reduction treatment, it was placed in a SEP-LF electroless nickel plating solution at 40° C. for 30 seconds to deposit a nickel film having a thickness of 30 nm as a metal film. Then, a heat treatment was performed at 100° C. for 30 minutes to discontinuously segmentalizing the nickel film with cracks by utilizing the difference in internal stress resulted from the thermal stress of the substrate and the nickel film, and an island-like metal film comprising a collection of fine metal regions of nickel with island-like structures was obtained. The widths of the cracks in this island-like metal film were 60 nm to 300 nm. Further, the thermal expansion coefficient of the ABS resin as a substrate: $60 \times 10^{-6}/°$ C. is 3 times or more of the thermal expansion coefficient of nickel: $14 \times 10^{-6}/°$ C. Subsequently, spray coating was performed such that an acrylic silicon-urethane based thermoset clear coating (R227HF) has a film thickness of 20 μm or more, and baking was performed at 80° C. for 1 hour, and then allowed to stand for 72 hours or more at room temperature to obtain a test sample.

The following adhesion test was conducted for the test sample. Using a new blade edge of a cutter knife (Material SK2, Hardness HV 820±30), 11 parallel lines equally spaced by 1 mm intervals were drawn on the coating surface of the test sample at an angle of about 35 to 45 degrees relative to the effective surface. Additional 11 parallel lines equally spaced in the same manner which intersect the previous lines at the right angle were drawn to form a grid. Next, a stretch of adhesive cellophane tape was adhered to cover the entire grid. As the adhesive cellophane tape, a Nichiban adhesive cellophane tape was used. The adhesive cellophane tape was adhered so that air bubbles were not left on the coating surface. Next, the tape was lifted at one end of the adhesive cellophane tape with the hand so that the angle between the adhesive cellophane tape and the test surface became about 45 degrees. Then the tape was rapidly pulled in that direction to peel the test piece off. Next, the number of squares in which 50% or more of the coating film was exfoliated in each square was found to be 0.

The following anti-chipping test was conducted for the test sample. The anti-chipping performance was measured with a gravelometer. The coating surface was mounted in a specified direction, and a chipping test was performed with standard stones (Macadam No. 6) at an ejection air pressure of 0.392±0.019 MPa, an air flow rate of 40 to 50 L/sec, a total amount used of 500±10 g and at room temperature. The sample after the test was removed, and stone wastes, dusts and the like on the coating surface were removed, and then a salt water spray test was performed for 80 hours. The test piece was removed after the salt water spray test, and the coating surface was washed with clean running water, and left to stand for 2 hours, and then an adhesive tape was adhered on the front side of the coating film to perform an adhesion test. As the adhesive tape, a Nichiban adhesive cellophane tape was used. The adhesive cellophane tape was adhered so that air bubbles were not left on the coating surface. Next, the tape was lifted at one end of the adhesive cellophane tape with the hand so that the angle between the adhesive cellophane tape and the test surface became about 45 degrees. Then the tape was rapidly pulled in that direction to peel the test piece off. Peel evaluations were classified using the evaluation table shown in Table 1. As a result, the best evaluation A was obtained.

TABLE 1

| | |
|---|---|
| A | The number of scratches reaching the base material is 20/100 cm$^2$ or less, and the plating surface is less exposed. |
| B | The number of scratches reaching the base material is more than 20/100 cm$^2$, but the plating surface is less exposed. |
| C | Detachment scratches of 1 mm or less are developed in the base material and the plating surface is more exposed. |
| D | Detachment scratches of more than 1 mm are developed in the base material, and the plating surface is more exposed. |
| E | A large number of detachment scratches of more than 1 mm are developed in the base material, and the plating surface is significantly more exposed. |

Example 2

Example 2 corresponds to the first embodiment. Using ABS resin (MTH2, Japan A&L Inc. Size: 130 mm×80 mm×3 mm; thermal expansion coefficient: $60×10^{-6}/°$ C.) as a substrate, a coating liquid in which an acrylic resin (UTU570: Toho Kaken Manufacturing Inc.) was diluted with a solvent was spray-coated on one side of the ABS resin material, and then UV curing was performed to form a base coat layer having a thickness of 20 μm as an organic coating film. Then, the substrate on which the base coat layer had been formed was immersed for 1 minute in Ace Clean A220 (Okuno Chemical Industries Co., Ltd.) under a condition of 60° C. to perform alkaline degreasing, and then immersed in a commercially available conditioning liquid for 2 minutes under a condition of 45° C., and then immersed in a 0.3 g/L tin-palladium aqueous solution for 2 minutes under a condition of 45° C.

Then, after the substrate was immersed in a 10% sulfuric acid aqueous solution for 1 minute under a condition of 45° C., the substrate in which a palladium metal as a catalyst has been adsorbed in the base coat layer was immersed for 40 seconds in an electroless palladium-phosphorus alloy plating bath having the following bath composition adjusted at 40° C. to deposit a metal film of the palladium-phosphorus alloy on the surface of the base coat layer.

Electroless palladium-phosphorus alloy plating bath
Palladium chloride: 0.01 M (mol/L)
Sodium hypophosphite: 0.2 M
Thiodiglycolic acid: 3.0 g/L When the substrate was removed from the electroless palladium-phosphorus alloy plating bath, cracks were created due to residual stress, and the palladium-phosphorus alloy film was discontinuously segmentalized with the cracks due to the difference in internal stress between the base coat layer and the palladium-phosphorus alloy film, and then an island-like metal film comprising a collection of fine metal regions of the palladium-phosphorus alloy with island-like structures was obtained. The widths of the cracks in this island-like metal film were 30 nm to 200 nm. Further, the thermal expansion coefficient of the ABS resin as a substrate: $60×10^{-6}/°$ C. is times or more of the thermal expansion coefficient of palladium: $12×10^{-6}/°$ C. A network of cracks was formed when the ratio of the thermal expansion coefficients of the substrate and the metal plating film was 3 times or more. Subsequently, spray coating was performed such that an acrylic silicone-urethane based thermoset clear coating (R227HF) has a film thickness of 20 μm or more, and baking was performed at 80° C. for 1 hour, and then allowed to stand for 72 hours or more at room temperature to obtain a test sample.

As a result of performing a similar adhesion test as in Example 1 on this test sample, the number of squares in which 50% or more of the coating film was exfoliated in each square was 0. Further, as a result of performing a similar anti-chipping test as in Example 1 on this test sample, the best evaluation A was obtained.

Example 3

Example 3 corresponds to the second embodiment. Using ABS resin (MTH2, Japan A&L Inc. Size: 130 mm×80 mm×3 mm; thermal expansion coefficient: $60×10^{-6}/°$ C.) as a substrate, a coating liquid in which an acrylic resin (UTU570: Toho Kaken Manufacturing Inc.) was diluted with a solvent was spray-coated on one side of the ABS resin material, and then UV curing was performed to form a base coat layer having a thickness of 20 μm as an organic coating film. Then, the substrate on which the base coat layer had been formed was immersed in Ace Clean A220 (Okuno Chemical Industries Co., Ltd.) for 1 minute under a condition of 60° C. to perform alkaline degreasing, and then an ultrasonic cleaning treatment was performed in a pH 2 buffer solution for 90 seconds.

Subsequently, it was immersed into benzalkonium chloride as a surfactant at 40° C. for 1 minute. Then, after dipped in Catalyst C at 30° C. for 5 minutes to perform a catalyst addition treatment, it was immersed in a buffer solution at pH 2.5 and 40° C. for 1 minute. After immersed in 5% sulfuric acid at 40° C. for 5 minutes as a reduction treatment, it was placed in a SEP-LF electroless nickel plating solution at 40° C. for 30 seconds to deposit a nickel film having a thickness of 30 nm as a first metal film. After washing with water, electrolytic plating was performed in the following sargent bath for 30 seconds under the conditions of a temperature of 50° C. and a current density of 30 A/dm$^2$ to laminate and deposit a decorative chromium film having a thickness of 60 nm as a second metal film.

Sargent bath
Chromic acid: 250 g/L
Chromic acid/sulfuric acid: 100/1
Sulfuric acid: 2 g/L After washing with water, when allowing to stand for 30 minutes for drying at a temperature of 100° C. in a constant temperature dryer as a heat treatment, cracks were created in the multi-layered metal film of a nickel film and a chromium film due to residual stress, and the multi-layered metal film was discontinuously segmentalized with the cracks due to the difference in internal stress between the substrate and the multi-layered metal film or the nickel film, and then an island-like multi-layered metal film comprising a collection of fine metal regions with island-like structures was obtained. The widths of the cracks in this island-like metal film were 200 nm to 500 nm. Further, the thermal expansion coefficient of the ABS resin as a substrate: $60×10^{-6}/°$ C. is 3 times or more of the thermal expansion coefficient of nickel: $14×10^{-6}/°$ C. and the thermal expansion coefficient of chromium: $6×10^{-6}/°$ C. Note that a metal plating on a metal usually shows a strong bonding strength since free electrons flow between them. When thermal stress and the like is created, less force is required for breaking a bonding portion between a multi-layered metal film and a substrate or a base coat layer than for detaching a bonding area of a multi-layered metal film. In addition, the adhesion strength of the chromium plating on nickel in the present Example is strong. Therefore, it is integrally and discontinuously segmentalized when the network of cracks are formed. Subsequently, spray coating was performed such that an acrylic silicone-urethane based thermoset clear coating (R227HF) has a film thickness of 20 μm or more, and baking was performed at 80° C. for 1 hour, and then allowed to stand for 72 hours or more at room temperature to obtain a test sample.

As a result of performing a similar adhesion test as in Example 1 on this test sample, the number of squares in which 50% or more of the coating film was exfoliated in each square was 0. Further, as a result of performing a similar anti-chipping test as in Example 1 on this test sample, the best evaluation A was obtained.

Example 4

Example 4 corresponds to the third embodiment. Using ABS resin (MTH2, Japan A&L Inc. Size: 130 mm×80 mm×3 mm; thermal expansion coefficient: $60\times10^{-6}/°$ C.) as a substrate, a coating liquid in which an acrylic resin (UTU570: Toho Kaken Manufacturing Inc.) was diluted with a solvent was spray-coated on one side of the ABS resin material, and then UV curing was performed to form a base coat layer having a thickness of 20 μm as an organic coating film. Then, the substrate on which the base coat layer had been formed was immersed in Ace Clean A220 (Okuno Chemical Industries Co., Ltd.) for 1 minute under a condition of 60° C. to perform alkaline degreasing, and then an ultrasonic cleaning treatment was performed in a pH 2 buffer solution for 90 seconds.

Subsequently, it was immersed into benzalkonium chloride as a surfactant at 40° C. for 1 minute. Then, after dipped into Catalyst C at 30° C. for 5 minutes to perform a catalyst addition treatment, it was immersed in a buffer solution at pH 2.5 and 40° C. for 1 minute. After immersed in 5% sulfuric acid at 40° C. for 5 minutes as a reduction treatment, it was placed in a SEP-LF electroless nickel plating solution at 40° C. for 30 seconds to deposit a nickel film having a thickness of 30 nm as a first metal film.

Then, copper electrolytic plating was performed in a copper sulfate plating solution at a temperature of 20° C. and a current density of 1 A/dm$^2$ to laminate and deposit a copper film having a thickness of 100 nm on the first metal film as a second metal film.

Further, electrolytic plating was performed in the following sargent bath for 30 seconds under the conditions of a temperature of 50° C. and a current density of 30 A/dm$^2$ to laminate and deposit a decorative chromium film having a thickness of 60 nm on the second metal film as a third metal film.

After washing with water, when allowing to stand for 30 minutes for drying at a temperature of 100° C. in a constant temperature dryer as a heat treatment, cracks were created in the multi-layered metal film of a nickel film and a chromium film due to residual stress, and the multi-layered metal film was integrally and discontinuously segmentalized with the cracks due to the difference in internal stress between the base coat layer and the multi-layered metal film or the first metal film, and then an island-like metal film comprising a collection of fine multi-layered metal regions with island-like structures was obtained. The widths of the cracks in this island-like metal film were 200 nm to 500 nm. Further, the thermal expansion coefficient of the ABS resin as a substrate: $60\times10^{-6}/°$ C. is 3 times or more of the thermal expansion coefficient of nickel: $14\times10^{-6}/°$ C., the thermal expansion coefficient of copper: $17\times10^{-6}/°$ C. and the thermal expansion coefficient of chromium: $6\times10^{-6}/°$ C. Subsequently, spray coating was performed such that an acrylic silicon-urethane based thermoset clear coating (R227HF) has a film thickness of 20 μm or more, and baking was performed at 80° C. for 1 hour, and then allowed to stand for 72 hours or more at room temperature to obtain a test sample.

As a result of performing a similar adhesion test as in Example 1 on this test sample, the number of squares in which 50% or more of the coating film was exfoliated in each square was 0. Further, as a result of performing a similar anti-chipping test as in Example 1 on this test sample, the best evaluation A was obtained.

INDUSTRIAL APPLICABILITY

The present invention can be used to manufacture a bright surface product as an automotive part having stress resistance against collisional external force, for example, such as a front grille, a bumper mall and a wheel cover.

DESCRIPTION OF REFERENCE NUMERALS 11, 21, 31 Substrate
12, 22, 32 Base coat layer
13 Metal film
23, 33 First metal film
24, 34 Second metal film
35 Third metal film
14 Fine metal region
25, 36 Fine multi-layered metal region
251, 361 First metal layer
252, 362 Second metal layer
363 Third metal layer
15, 26, 37 Crack
16, 27, 38 Top coat layer

The invention claimed is:
1. A method of manufacturing a surface product as a part of an automobile having stress resistance against collisional external force, the method comprising:
    a first step of performing electroless plating to form a metal film on a substrate or a base coat layer deposited on the substrate;
    a second step of discontinuously segmentalizing the metal film with cracks by utilizing-the internal stress remaining in the metal film once the substrate and the metal film are removed from the electroless plating bath and cooled without a heat treatment, after removal of the metal film from the electroless plating bath, to form a multi-island-like metal film comprising a collection of metal regions and having an appearance of an integrated surface; and
    a third step of forming a translucent top coat layer on an outward appearance side of the part of an automobile to cover the metal regions of the multi-island-like metal film and enter into the cracks to make contact with the substrate or the base coat layer.

2. The method of manufacturing a surface product according to claim 1, wherein the substrate is of a synthetic resin, or the substrate and the base coat layer are of synthetic resins.

3. The method of manufacturing a surface product according to claim 1, wherein the widths of the cracks are 10 nm to 2 μm.

4. The method of manufacturing a surface product according to claim 1, wherein the surface product as an automotive part having stress resistance against collisional external force is a front grille, a bumper mall or a wheel cover.

5. The method of manufacturing a surface product according to claim 1, wherein the metal film is discontinuously segmentalized by utilizing the difference in internal stress between the substrate and the metal film which remains in a stress state where they are removed from an electroless plating bath.

\* \* \* \* \*